Patented Sept. 10, 1929.

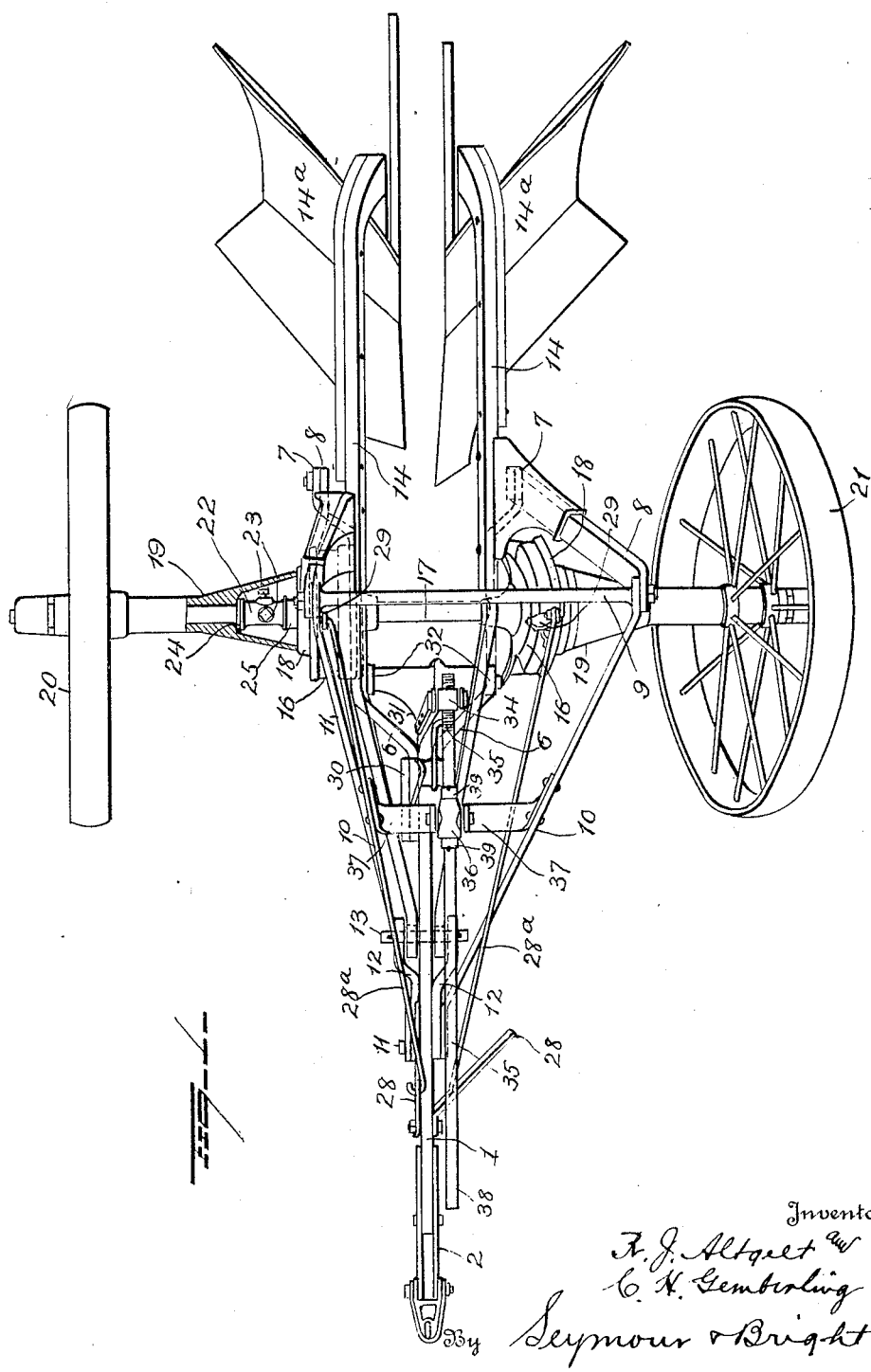

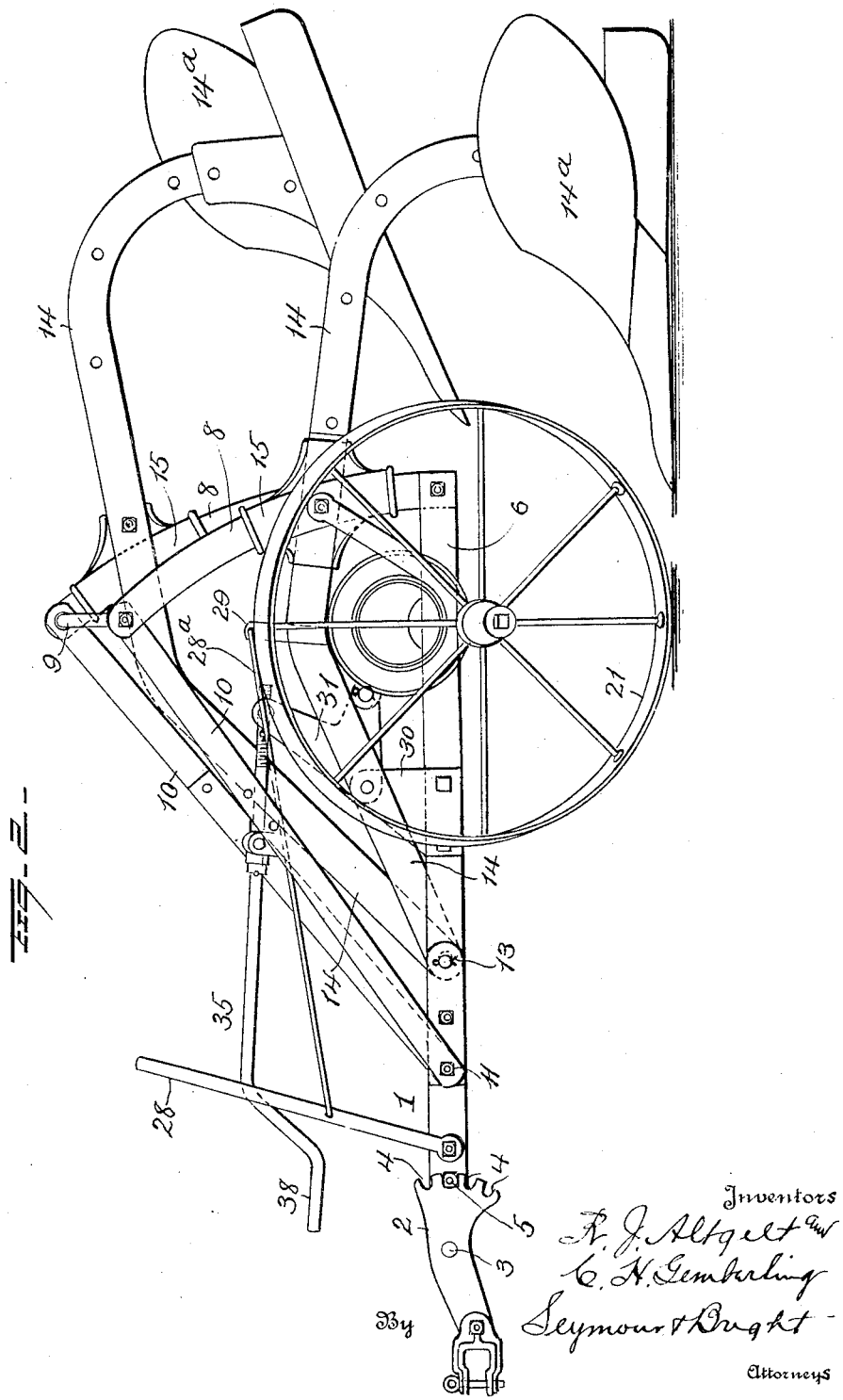

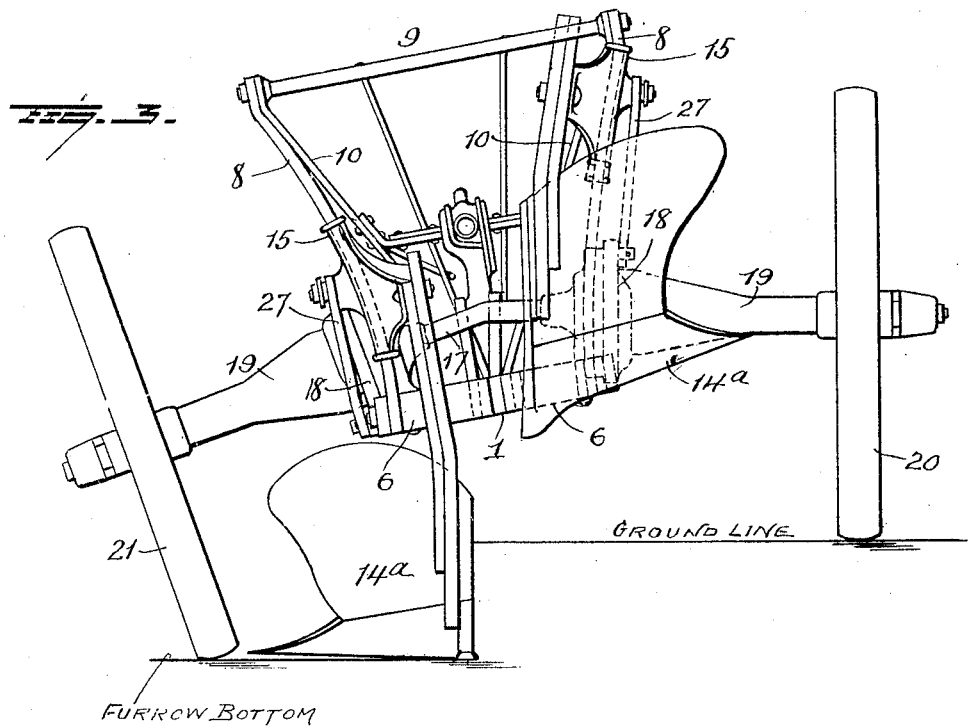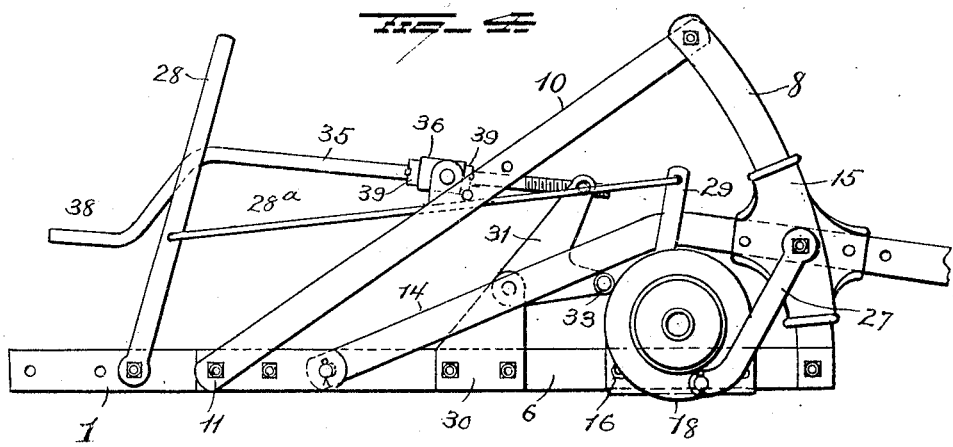

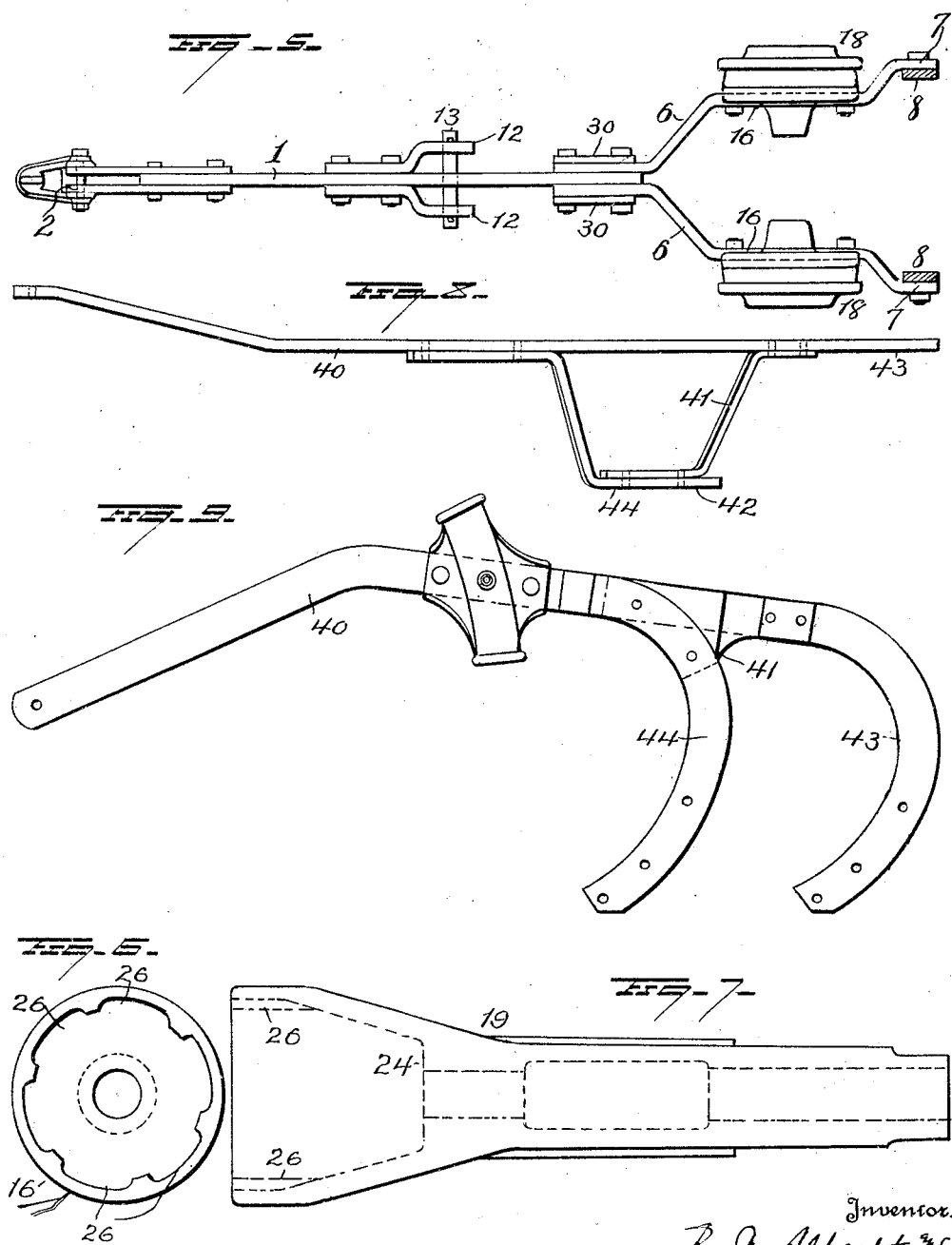

1,727,852

UNITED STATES PATENT OFFICE.

RUDOLPH J. ALTGELT AND CAMERON H. GEMBERLING, OF SOUTH BEND, INDIANA, ASSIGNORS TO OLIVER CHILLED PLOW WORKS, OF SOUTH BEND, INDIANA.

PLOW.

Application filed May 17, 1927. Serial No. 192,055.

This invention relates to improvements in plows and has particular reference to that type known in the art as "two-way" plows.

One object of the present invention is to improve, in various respects, the construction of a two-way plow and to insure the proper independent upward and downward movements of the respective beams through the medium of wheel-actuated power lift means.

A further object is to so construct a two-way plow that one wheel will run in a previously plowed furrow and engage in the angle at the juncture of the furrow bank with the bottom of the furrow, especially when the plow is working on a hill-side.

A further object is to so construct a two-way plow structure that the plow bases shall be caused to assume the correct position in the ground regardless of whether the plowing is deep or shallow.

A further object is to so construct a two-way wheeled plow that one axle will carry both wheels and will have its opposite end portions disposed in such angular relation that when one of the wheels is running on the unplowed land it will be disposed perpendicularly thereto, and the other wheel will be inclined relatively to the perpendicular disposition of the first mentioned wheel and run in a previously plowed furrow.

A further object is to so construct a two-way wheeled plow that the wheels shall act alternately as furrow and land wheels according to the direction in which the plow may be traveling, either of said wheels when serving as a furrow wheel being disposed in an inclined position relatively to the other wheel and adapted to run in a previously plowed furrow while the other wheel is running on the unplowed land.

With these and other objects in view, the invention consists in certain novel features of construction and combinations of parts as will be hereinafter set forth and pointed out in the claims.

In the accompanying drawings,—

Figure 1 is a plan view of a two-way plow showing an embodiment of the invention.

Figure 2 is a view in side elevation.

Figure 3 is a rear view.

Figure 4 is a partial side elevation.

Figure 5 is a detail view.

Figures 6 and 7 are detail views of one of the elongated wheel boxes, and

Figures 8 and 9 illustrate a plow gang construction.

In the drawings, a straight frame bar is shown at 1 and is provided at its forward end with a clevis 2 which is connected thereto in a manner to permit vertical adjustment, said clevis being pivotally connected at 3 to the frame bar 1 and provided with a series of notches 4 for cooperation with a pin 5 passing through the bar 1. Frame extensions 6—6 are secured to the rear portion of the frame bar 1 and extend laterally and rearwardly therefrom, the rear portions of said frame extensions being spaced apart and parallel throughout a portion of their lengths, and at their rear ends, said frame extensions are provided with offset arms 7. To these arms, the lower ends of segmental guide bars 8 are secured and these bars not only extend upwardly and forwardly from their connection with the rear arms 7 of the extension frame bars 6, but they are also made to curve laterally as shown in Fig. 3, so that their upper portions will be spaced further apart than their lower ends, for a reason which will hereinafter appear. The upper ends of the guide bars 8 are connected by a transverse rod or bar 9 and to end portions of this rod or bar, the rear ends of diagonal brace bars 10 are connected, the forward ends of said brace bars being secured at 11 to the frame bar 1.

Brackets 12 are secured to respective sides of the frame bar 1 forwardly of the rear frame extensions 6 and through these brackets and the frame bar 1, a transversely disposed bolt 13 passes. The forward end portions of plow beams 14 (carrying plow-bases 14ª) are hung on this bolt and are thus pivotally connected with the frame, the holes in the beams through which said bolt passes being of appreciably greater diameter than the bolt 13, in order that the beams may have free up and down movements on the bars 8, with which they are movably connected through the medium of curved sleeves 15 said sleeves being secured to the beams and slidably fitted on the bars.

Housings 16 for clutch mechanisms are secured to the frame extensions 6 (the latter being preferably such as disclosed in Patent No. 1,496,441, granted to use on the 3rd day of June 1924, except that the housings 16 are secured to the frame and wheel boxes are, in the present instance, of considerable length and different in shape from those shown in our former patent), and through said housings and clutch mechanisms, an axle 17 passes, said axle being so bent or otherwise formed that one-half thereof will be disposed at an obtuse angle to the other half as indicated in Fig. 3. The clutch mechanism is intended, as in our patented construction, to operatively connect a lifting disk 18 with a carrying wheel. In the present instance, a clutch mechanism and lifting disk are provided for each of the carrying wheels. The respective end portions of the axle extend considerable distances laterally beyond respective sides of the frame and have mounted thereon wheel boxes 19 for carrying wheels 20—21 located at the outer ends of said boxes. In the present instance, the inner end portions of the wheel boxes are made conical in form and each has a chamber in which a retaining sleeve 22 is located, said sleeve being secured to the axle by set screws 23 and being disposed between a shoulder 24 in the wheel box and an abutment 25 on the lifting disk. At its inner end, each wheel box 19 is provided interiorly with an annular series of notches 26 for cooperation with parts of the clutch mechanism substantially as disclosed in our patent hereinbefore identified.

Lifting arms or links 27 are pivotally connected respectively with the respective lifting disks 18 and with the guide sleeves 15. During normal operation of the plow, the carrying wheels will run freely on the axle but either of the clutch mechanisms may be operated (through the medium of a hand lever 28 connected by a rod 28$^a$ with the control lever 29 of said mechanism), and the adjacent wheel box and consequently the wheel thereon will be locked to the adjacent lifting disk and cause the latter to turn by power derived from the forwardly moving carrying wheel. As the disk 18 turns, power will be transmitted through the arm or link 27 to the sleeve 15 on one of the plow beams and thus cause the raising of the latter. This plow beam will be retained in its elevated position after the wheel box shall have been released to permit free rotation of the carrying wheel and the said plow beam may be subsequently dropped to working position, all as fully disclosed in our former patent herein identified.

Brackets 30 are secured to the frame approximately at the juncture of the extension members 6 with the frame bar 1 and project upwardly from the same. These brackets serve as mountings for a bell-crank 31. One arm of this bell-crank is formed with a crosshead 32 on which rollers 33 are mounted and so positioned as to be disposed beneath the respective plow beams. The other arm of the bell-crank 31 has swiveled to its upper end an internally threaded sleeve 34 for the accommodation of the threaded portion of a screw shaft 35. The plain portion of the shaft 35 passes through a sleeve 36 pivotally supported in bracket arms 37 secured to the braces 10. From its mounting in the sleeve 36, the shaft 35 extends forwardly and is provided at its forward end with an operating crank 38. Longitudinal movement of the shaft 35 through the sleeve 36 will be prevented by means of collars 39 pinned or otherwise secured to said shaft 35 at respective ends of the sleeve 36. By turning the shaft 35 in one direction or the other, the bell-crank will be turned on its pivotal mounting and the rollers carried by said bell-crank will be raised or lowered for the purpose of regulating the depth to which the bases carried by the plow beams may enter the ground and thus the depth of plowing may be regulated and controlled.

In Figs. 1, 2, 3 and 4, two plow means each carrying a single plow base is shown, but instead of such construction plow gangs may be employed. In Figs. 8 and 9 are shown a gang of beams or plow base carrying members. In this construction the main beam is represented at 40 and to this beam laterally projecting bracket means 41 is secured. Another beam 42 is secured to one side of the beam 40 and projects outwardly and rearwardly therefrom and is secured to the bracket 41. The beams 40 and 42 are provided at their rear ends with standards 43 and 44 respectively for the accommodation of plow bases.

With the construction and arrangement of parts hereinbefore described, one carrying wheel or the other will run in a previously plowed furrow according to the direction in which the plow is traveling and this wheel will be so inclined as to run in the furrow close to the bank thereof,—such arrangement being of particular importance in preventing the plow from sliding sidewise down hill when plowing on the side of a hill.

By causing the guide bars 8 to be closer together at their lower ends than at their upper ends and curving said bars laterally, the plow bases will be caused to assume the correct position in the ground regardless of whether deep or shallow plowing is being performed.

Having fully described our invention what we claim as new and desire to secure by Letters-Patent, is:

1. In a two-way plow, the combination with a wheeled frame, curved guide bars extending upwardly and outwardly therefrom, plow beams pivotally connected with the wheeled frame, and sleeves secured to said beams and movable respectively on the guide bars, of lifting disks, means for connecting said lifting disks respectively with the respective carrying wheels, and links each pivoted at its lower end to a lifting disk and at its upper end to the adjacent sleeve.

2. In a two-way plow, the combination with a frame and plow beams connected therewith, of an axle comprising two members disposed at an obtuse angle to each other and extending appreciable distances laterally from the frame, carrying wheels, boxes for said wheels, each having a conical inner portion with a chamber therein, a sleeve mounted on the axle within each of the box chambers, means for securing said sleeves to the axle members, and means cooperable with said wheel boxes whereby power derived from the forward travel of one wheel or the other will be transmitted to one plow beam or the other to raise the same.

3. In a two-way plow, the combination with a frame, of carrying wheels disposed at an angle to each other whereby either of said wheels may operate as a furrow wheel inclining outwardly and the other a land wheel disposed perpendicular to the land during the normal operation of the plow, guide bars secured at their lower ends to the rear portion of the frame and curving upwardly and forwardly and also outwardly whereby the upper portions of said guide bars will be spaced further apart at their upper ends than at their lower ends, a member connecting the upper ends of said guide bars, braces extending from the upper ends of the guide bars to the forward portion of the frame, plow beams pivotally connected with the frame, sleeves secured to said plow beams and movable on the curved guide bars, and means connected with said sleeves to raise one or the other plow beam.

4. In a two-way plow, the combination with a frame and plow beams connected therewith, of a continuous axle, having its end portions in angular relation, wheels mounted on the end portions of the axle and thereby disposed one to run in a furrow and the other to run on unplowed ground, and power lift means between each wheel and the plow beams respectively.

In testimony whereof, we have signed this specification.

RUDOLPH J. ALTGELT.
CAMERON H. GEMBERLING.